Patented May 3, 1932

1,856,929

UNITED STATES PATENT OFFICE

JOHN SANFORD PECK, OF SCARSDALE, AND EUGENE V. BARRETT, OF WHITE PLAINS, NEW YORK

LIGHTWEIGHT BUILDING MATERIALS

No Drawing.   Application filed November 13, 1930.   Serial No. 495,420.

This invention relates to improvements in lightweight building materials. It includes both the method of manufacture and the product.

Light weight building materials are demanded for many construction purposes. The use of light materials reduces the weight of a structure and thus materially reduces its cost. Porous materials, such as those contemplated by this invention are advantageous because they are heat insulators, and because they stop or hinder the transmission of sound. The building materials of this invention may be made from cheap raw material and the cost of manufacture is low.

The light weight building materials of this invention are made from argillaceous material such as shale or clay which on burning gives a product of sufficient strength for the intended purpose. The composition of the starting material may vary over wide limits. Ordinary clays such as blue clay can be used. Argillaceous shales which have been ground to suitable fineness can be used. Water or an aqueous solution such as a solution of carbon dioxide in water, for example, is added to the earthy starting material in an amount sufficient to produce a slurry or a plastic mass. A soluble gas such as carbon dioxide or sulfur dioxide or ammonia, etc. it incorporated in the mass preferably by dissolving it in the water, or if the earthy material is wet, by dissolving it in the earthy mass before mixing them together, or the water may be mixed with the earthy material before dissolving the gas therein. On subsequent heating, the slurry or plastic mass puffs up as the gas is liberated and on baking a vesicular mass suitable for use as a light weight building material is formed. By heating the mass to a temperature below the fusing point a material suitable for use as lightweight aggregate for concrete is obtained. Porous brick may also be formed by heating for a longer time. The invention includes both light weight aggregate and bricks or other units produced in this manner.

The products of this invention may consist solely of the vesicular mass which results from heating a solution of a gas in a mixture of clay or ground shale and water. Other ingredients may be added such as coloring matter, etc., if desirable. We prefer to use clay as it is found in nature without adding to it any non-volatile constituents whatsoever.

According to the preferred method of carrying out the invention, the clay " out of the bank", with or without drying, is mixed with water to give a slurry or plastic mass of the desired consistency, and the soluble gas is dissolved in all or a part of the water before it is mixed with the clay. Preferably the clay is partially or entirely dried and then to the resulting clay which is of known water content a measured amount of water containing a known percentage of gas is added. This gives a plastic mass or slurry which contains a known quantity of gas and on heating a mass of regulated porosity is obtained.

Although different gases may be employed, we prefer to use carbon dioxide. The carbon dioxide may be incorporated in the mass in a solid or gaseous state. We prefer to introduce it by adding it as a water solution. The water may be gasified at a known temperature and pressure and, if saturated with the gas, the amount of gas, which a given volume of water under these conditions contains, can be readily calculated. The amount of gas introduced in to the product can be controlled in this manner. We prefer to carbonate the water at a temperature of, for example, 50–60° F. although temperatures up to 80° F. may be employed, and we prefer to use water which is carbonated at about fifteen pounds absolute pressure although water carbonated at a higher pressure may be employed.

When the water is gasified under a high pressure, the subsequent mixing of the water with the earthy material must be carried out under pressure to prevent premature loss of the gas. By gasifying the water under a high pressure, a large amount of gas may be introduced into the clay with a small amount of water and this is desirable especially where fuel costs are high because then it will not be necessary to drive off so much water in the drying operation. High pressures can be used in carrying out the process as a batch operation or the process may be made continuous by providing suitable pressure charging and discharging chambers on the mixer, etc.

We prefer to gasify the water at a pressure approximating atmospheric and carry out the operation as a continuous process. Pressure mixers are not necessary for handling liquids gasified at atmospheric pressure. The water may be gasified by atomizing it in an atmosphere of the gas or in any other suitable manner.

The clay may be partially or completely dried before it is mixed with the gasified water. Where fuel is cheap the clay may advantageously be dried until it can be powdered and it is then crushed. The dry powdered clay is then wet with the gasified water. The clay and water are thoroughly mixed so that the gas is evenly distributed throughout the mass.

The mixture of clay and water in which the gas is dissolved is heated to the required degree. As heat is applied the gas is liberated and the mass puffs up. A very large number of fine pores are formed throughout the mass and the mass is of such consistency that it retains a porous structure throughout the heat treatment. The final baked product is full of fine pores. The nature of the heat-treatment will be determined by the product desired. The mass may be dried and then burned as one continuous operation. If bricks are to be produced, the mass may be molded while still in a plastic condition. If light weight aggregate is desired the mass may be dried and then crushed before burning or it may be dried and burned as a continuous operation and then crushed. The final temperature to which the mass is heated will be governed by the nature of the product desired and to some extent by the composition of the clay employed. The length of burning will depend upon the composition of the clay and the size of the units of mass treated and also by the nature of the product desired.

In the production of light weight aggregate the mass is preferably burned at a temperature below that at which carbon dioxide, etc. is driven off from calcium carbonate because free lime in the product would slake when mixed with water and the product would disintegrate. This temperature is ordinarily just below the fusion point of clay and ordinarily if light weight aggregate is produced it is desirable not to heat the mass above the fusion point of the clay. The fusion point of the clay will depend upon its composition, for example, a clay of higher iron content has a lower fusion point than a similar clay containing less iron.

In the manufacture of bricks a higher temperature will be employed. The burning will consume many hours and the operation must be carefully controlled to prevent warping, etc. as in the manufacture or ordinary nonporous bricks.

If shale is used, shale which is of an argillaceous nature is ground to such a degree of fineness as to mix readily and uniformly with water. The ground shale is then preferably mixed with gasified water, such as a solution of carbon dioxide water, to form a mass of the desired consistency. This is then subjected to the proper heat treatment, etc., to form light weight aggregate for concrete or porous bricks, etc. Variations in the process may be made, as by regulating the amount of water and gas employed to give a product of the desired composition, and where light weight aggregate is being formed the mass may be ground or crushed before or after burning.

The products obtained by the process of this invention differ from light weight building materials now on the market, many of which have large irregular pores. The products of this invention contain many fine pores evenly distributed. The structure is uniform and of very fine texture. According to the preferred method of operation the only ingredients employed are clay or shale, water and a gas, and in this case the final product will consist solely of clay or shale and the pores at least temporarily will be filled with the gas employed. The clay or shale will not undergo any permanent chemical change except that produced by the burning operation which will oxidize the iron, etc.

The invention will be further illustrated by specific examples of the production of light weight aggregate and porous bricks, but it is intended and is to be understood that it is not limited thereto.

*Example.*—Hudson River clay out of the bank is dried until it can be powdered. It is then crushed in rolls. 100 parts by weight of the dry pulverized clay are mixed with 500 parts by weight of carbonated water and the mixing may be done in an open mixer. The carbonated water which is used is water which at a temperature between 50 and 60° F. has been saturated with carbon dioxide under fifteen pounds absolute pressure.

Preferably the mixing operation is carried out on a continuous basis by adding the clay and water at one end of a rotating cylindrical mixer and drawing off the light weight gasified mixture from the other end of the mixer. The mixture is run or otherwise conveyed into pans and dried at from 200–400° F. It is desirable to heat the mixture gradually during the dehydration in order to prevent the formation of large bubbles of steam within the mass which might carry off the gas and prevent the formation of the desired porous structure of fine texture.

In the manufacture of porous brick the mass, when of the right consistency, is molded and then fired.

In the manufacture of light weight aggregate the mass is dried and then preferably crushed before it is burned. Aggregate made from Hudson River clay is burned, preferably at a temperature just below 1700° F. The burned mass is sized by screening or crushing and screening to obtain aggregate of the desired size.

The hot gases from the kiln in which the material for the aggregate or brick is burned, may be used for drying the clay prior to mixing the gas with it, or after the gas has been incorporated therewith and before the material is burned. During the burning operation the material may be conveyed through the kiln on a continuous conveyor. In the manufacture of aggregate the drying and burning may, if desired, be accomplished as a continuous operation on a continuous conveyor.

The weight of the aggregate will depend upon the amount of gas dissolved in the clay and water mixture. If water saturated with a gas is used the amount of gas is dependent upon the temperature at which the water is carbonated and mixed with the clay or shale, and by the amount of carbonated water employed.

Instead of first dissolving the gas in the water and producing the slurry from the gasified water and clay or shale, the water may be mixed with the clay or shale and then the gas may be introduced into the mixture of clay or shale and water at atmospheric pressure or increased pressure, as when a highly porous mass is desired.

Concrete is generally mixed according to the 1—2—4 formula (i. e. 1 part cement, 2 parts sand or fine aggregate and 4 parts gravel or coarse aggregate), and concrete mixed according to this formula takes about 5.3 to 5.9 bags of cement per cubic yard. Most light weight aggregate takes more cement than this. Tests with light weight aggregate produced according to our process show that less cement is necessary with our aggregate than with other light weight aggregates and the amount of cement may not exceed that used in producing concrete according to the usual 1—2—4 formula. Instead of sand we may use the fines resulting from the crushing operation. Aggregate weighing 30 to 40 pounds per cubic foot (dry loose weight) may be produced.

We claim:

1. The method of producing light weight building material which comprises producing a mixture of water and an argillaceous material and a sufficient amount of a water-soluble gas dissolved therein to produce a porous mass on subsequent heating, then heating the mixture to liberate the gas and form a porous mass.

2. The method of producing a light weight building material, which comprises dissolving in water a sufficient quantity of a water-soluble gas to produce a solution which when mixed within an argillaceous material and then heated will puff up, mixing the solution with an argillaceous material and then heating the mixture to liberate the gas and form a porous mass.

3. The method of producing a light weight building material, which comprises dissolving in water a sufficient quantity of a water-soluble gas to produce a solution which when mixed with argillaceous material and then heated will puff up, mixing the solution with an argillaceous material, heating the mixture to liberate the gas from the solution and form a porous mass and continuing the heating to burn the porous mass.

4. The method of producing a light weight building material, which comprises heating a mixture consisting of clay, water and a quantity of a water-soluble gas sufficient to produce a porous mass when heated, so as to liberate the gas from solution and produce a porous mass.

5. The method of producing a light weight building material, which comprises heating a mixture consisting of shale, water and a quantity of a water-soluble gas sufficient to produce a porous mass when liberated, so as to liberate the gas from solution and produce a porous mass.

6. The method of producing light weight aggregate, which comprises heating a mixture of argillaceous material and water in which a gas is dissolved in a quantity sufficient to produce a porous mass when liberated, thereby liberating the gas and forming a porous mass and by continued heating burning the porous mass, and then crushing the porous mass.

7. The method of producing light weight aggregate, which comprises heating a mixture of argillaceous material and water in which a sufficient quantity of gas is dissolved to form a porous mass when liberated, thereby liberating the gas and forming a porous mass, and by continued heating drying it, crushing the dried mass and then burning it.

8. The method of producing a light weight building material, which comprises dissolving sufficient carbon dioxide in water to produce a solution which when mixed with argillaceous material and then heated will puff up due to the liberation of carbon dioxide therefrom mixing argillaceous material with the solution of carbon dioxide in water and then heating the mixture to liberate the gas and form a porous mass.

9. The method of producing a light weight building material, which comprises drying clay, dissolving a gas in water in a quantity such that when mixed with clay and then heated the liberated gas will cause the mixture to puff up, mixing the solution with the clay and then heating the mixture to liberate the gas and form a porous mass.

10. The method of producing light weight building material, which comprises grinding shale, dissolving a gas in water in a quantity such that when mixed with shale and then heated the liberated gas will cause the mixture to puff up, mixing the solution with the ground shale and then heating the mixture to liberate the gas and form a porous mass.

11. The method of producing a porous brick, which comprises dissolving a gas in water in a quantity such that when mixed with argillaceous material and then heated the liberated gas will cause the mixture to puff up, mixing the solution with argillaceous material, heating the mixture to liberate the gas and form a porous mass and continuing the heating until the clay is burned.

12. The method of producing light weight aggregate, which comprises heating a mixture consisting of Hudson River clay, water and sufficient carbon dioxide dissolved therein to produce a porous mass when heated, so as to liberate the gas and form a porous mass.

13. The method of producing a lightweight building material which comprises mixing argillaceous material with water, dissolving a gas into the mixture in sufficient quantity to form a porous mass when liberated and then heating the resulting mixture to form a porous mass.

In testimony whereof we affix our signatures.

JOHN SANFORD PECK.
EUGENE V. BARRETT.